(12) United States Patent
Wang

(10) Patent No.: US 10,374,535 B2
(45) Date of Patent: Aug. 6, 2019

(54) MOTOR CONTROL APPARATUS AND MOTOR DRIVE APPARATUS

(71) Applicant: Kabushiki Kaisha Toshiba, Minato-ku, Tokyo (JP)

(72) Inventor: Shen Wang, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 15/690,827

(22) Filed: Aug. 30, 2017

(65) Prior Publication Data

US 2018/0241327 A1     Aug. 23, 2018

(30) Foreign Application Priority Data

Feb. 17, 2017 (JP) ................. 2017-027747

(51) Int. Cl.
| | |
|---|---|
| *H02P 6/16* | (2016.01) |
| *H02P 6/17* | (2016.01) |
| *H02P 6/18* | (2016.01) |
| *H02K 11/215* | (2016.01) |

(52) U.S. Cl.
CPC .............. *H02P 6/17* (2016.02); *H02K 11/215* (2016.01); *H02P 6/16* (2013.01); *H02P 6/18* (2013.01)

(58) Field of Classification Search
CPC ..................... H02P 6/17; H02P 6/18
USPC ................ 318/400.03, 400.01, 700
See application file for complete search history.

(56) References Cited

U.S. PATENT DOCUMENTS

| | | | | |
|---|---|---|---|---|
| 5,796,228 A | * | 8/1998 | Kojima | ............. H02P 25/03 318/605 |
| 6,242,882 B1 | * | 6/2001 | Kaneko | ............. H02P 21/18 318/608 |
| 7,696,705 B2 | * | 4/2010 | Stork | ............. G01P 3/487 318/244 |
| 9,225,271 B2 | | 12/2015 | Oomura et al. | |

FOREIGN PATENT DOCUMENTS

JP         2015-062329 A        4/2015

* cited by examiner

*Primary Examiner* — David Luo
(74) *Attorney, Agent, or Firm* — White & Case LLP

(57) ABSTRACT

According to an embodiment, a motor control apparatus includes a current detecting unit that detects a motor current, a rotation position detecting unit that detects a rotation position of a rotor, a phase difference calculating unit that calculates first phase difference information between the motor current and the rotation position when a rotation speed of a motor is equal to or lower than a predetermined rotation speed and second phase difference information when the rotation speed of the motor exceeds the predetermined rotation speed, a storage unit that stores phase correction information based on the first phase difference information, a correcting unit that outputs a corrected rotation position signal and a drive unit that generates a drive signal to be output to the motor.

12 Claims, 11 Drawing Sheets

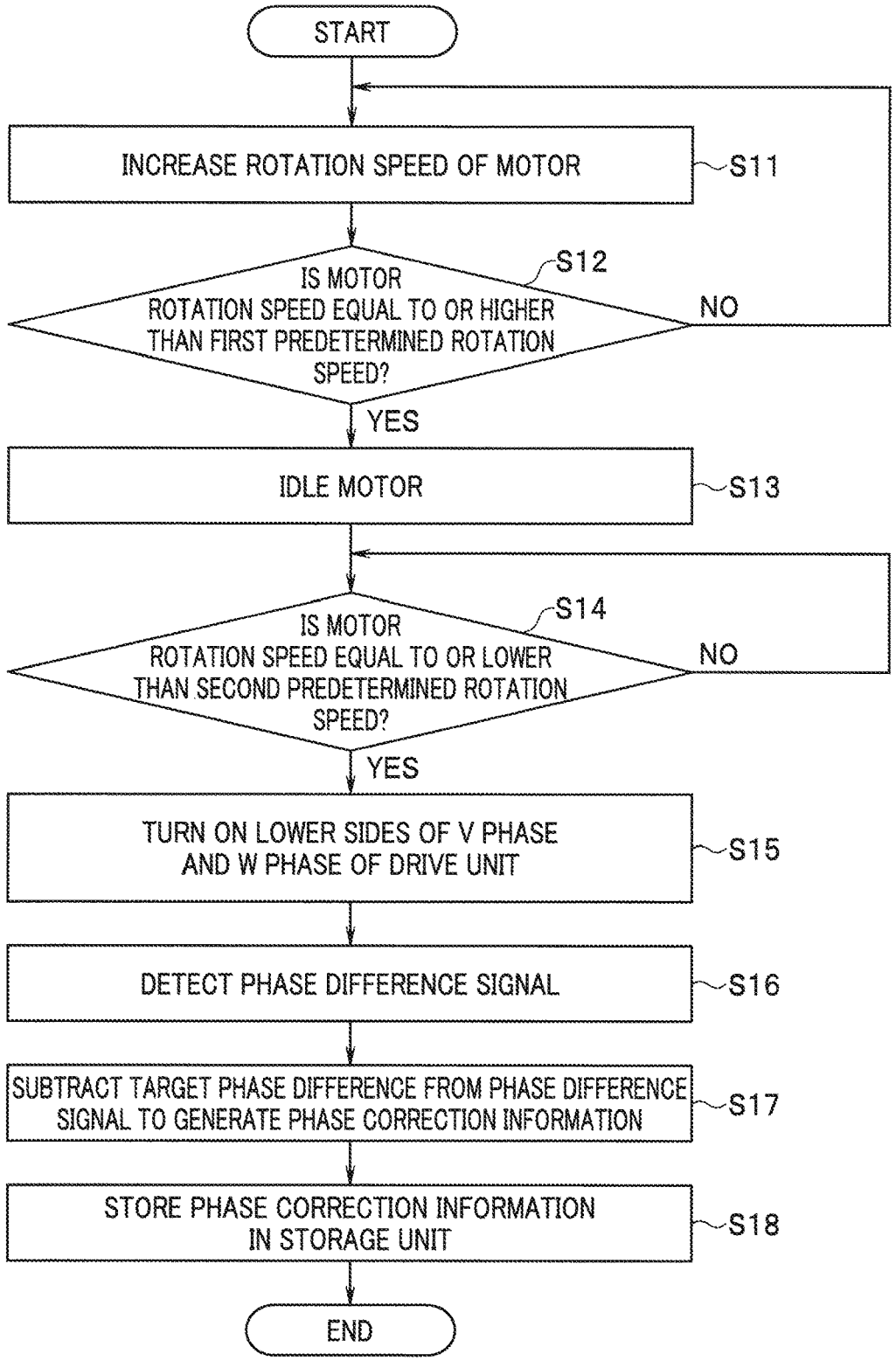

MOTOR CONTROL APPARATUS AND MOTOR DRIVE APPARATUS

CROSS-REFERENCE TO RELATED APPLICATION

This application is based upon and claims the benefit of priority from the prior Japanese Patent Application No. 2017-27747 filed in Japan on Feb. 17, 2017; the entire contents of which are incorporated herein by reference.

FIELD

An embodiment described herein relates generally to a motor control apparatus and a motor drive apparatus.

BACKGROUND

As a control method for a motor, there is a method in which a rotation angle of a rotor of the motor is detected based on information of a position sensor such as a Hall element, and a drive signal for driving the motor is output to the motor after a phase of a drive voltage is adjusted according to the detected rotation angle.

The position sensor is attached to a predetermined attachment position inside the motor. If there is an error in the attachment position of the position sensor, even if a phase of the drive signal is adjusted based on the information of the position sensor, efficiency of the motor cannot be optimized.

BRIEF DESCRIPTION OF THE DRAWINGS

FIG. 6 is a flowchart illustrating flow of correction information storage processing of the motor drive apparatus according to the embodiment;

DETAILED DESCRIPTION

A motor control apparatus of an embodiment includes a current detecting unit, a rotation position detecting unit, a phase difference calculating unit, a storage unit, a correcting unit and a drive unit. The current detecting unit detects a motor current flowing through at least one coil of a motor. The rotation position detecting unit detects a rotation position of a rotor provided in the motor. The phase difference calculating unit calculates first phase difference information which is a phase difference between the motor current and the rotation position when a rotation speed of the motor is equal to or lower than a predetermined rotation speed, and second phase difference information which is a phase difference between the motor current and the rotation position when the rotation speed of the motor exceeds the predetermined rotation speed. The storage unit stores phase correction information based on the first phase difference information. The correcting unit corrects the rotation position detected by the rotation position detecting unit based on the second phase difference information input from the phase correction information and the phase difference calculating unit and outputs a corrected rotation position signal. The drive unit generates a drive signal to be output to the motor based on the corrected rotation position signal.

EMBODIMENT

An embodiment will be described below with reference to the drawings.

Configuration

Figure 1:
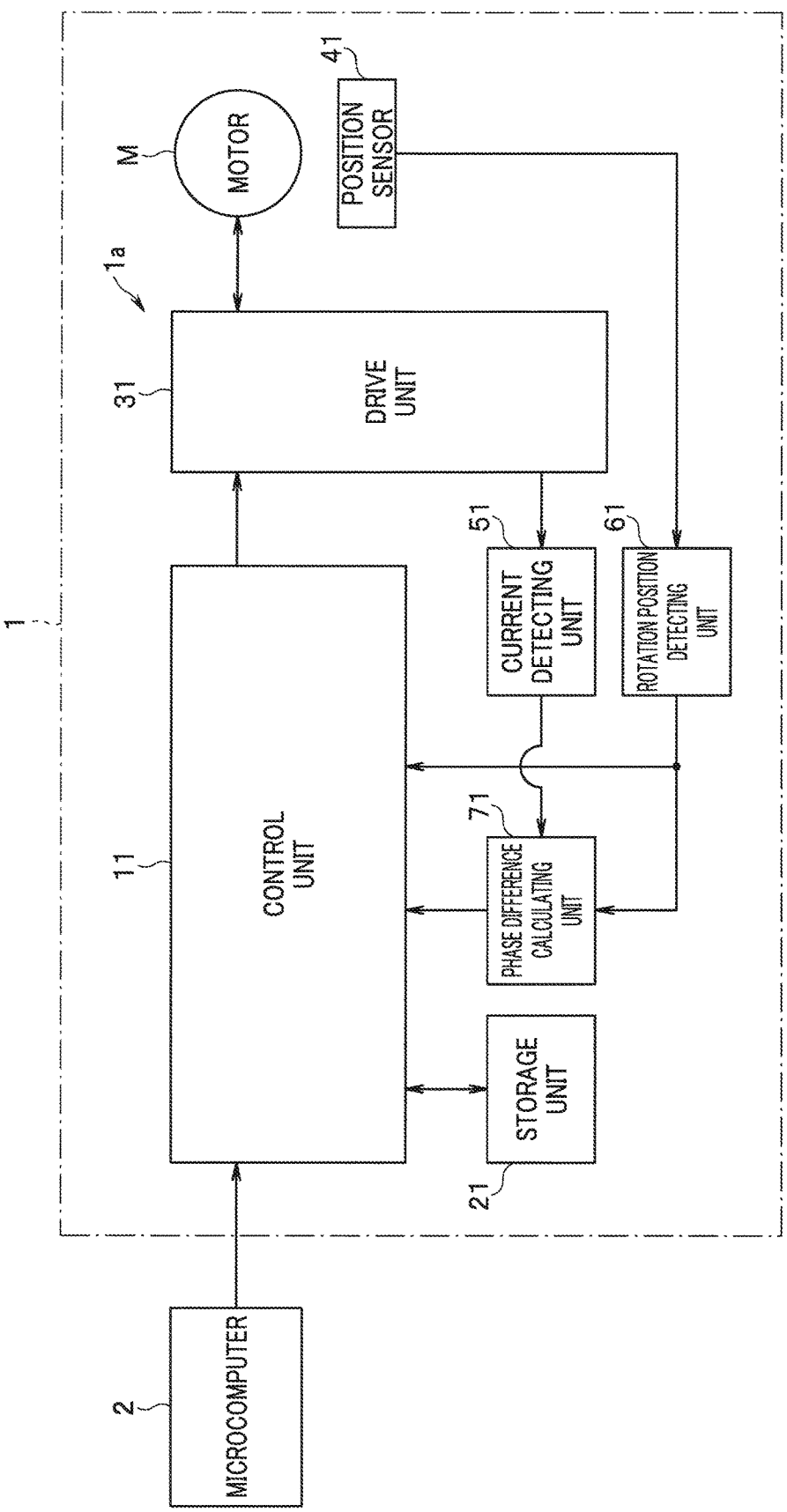
FIG. 1 is a configuration diagram illustrating an example of a configuration of a motor drive apparatus according to an embodiment.

FIG. 1 is a configuration diagram illustrating an example of a configuration of a motor drive apparatus 1 according to the embodiment.

As illustrated in FIG. 1, the motor drive apparatus 1 includes a control unit 11, a storage unit 21, a drive unit 31, a position sensor 41, a current detecting unit 51, a rotation position detecting unit 61, a phase difference calculating unit 71 and a motor M. The motor drive apparatus 1 is connected to a microcomputer 2 and controls a lead angle of the motor M so that a phase of an induced voltage matches a phase of a motor current, to optimize efficiency of the motor M based on an instruction input from the microcomputer 2.

The control unit 11, the storage unit 21, the drive unit 31, the position sensor 41, the current detecting unit 51, the rotation position detecting unit 61 and the phase difference calculating unit 71 are a motor control apparatus 1a which is a control apparatus controlling the motor M.

Figure 2:
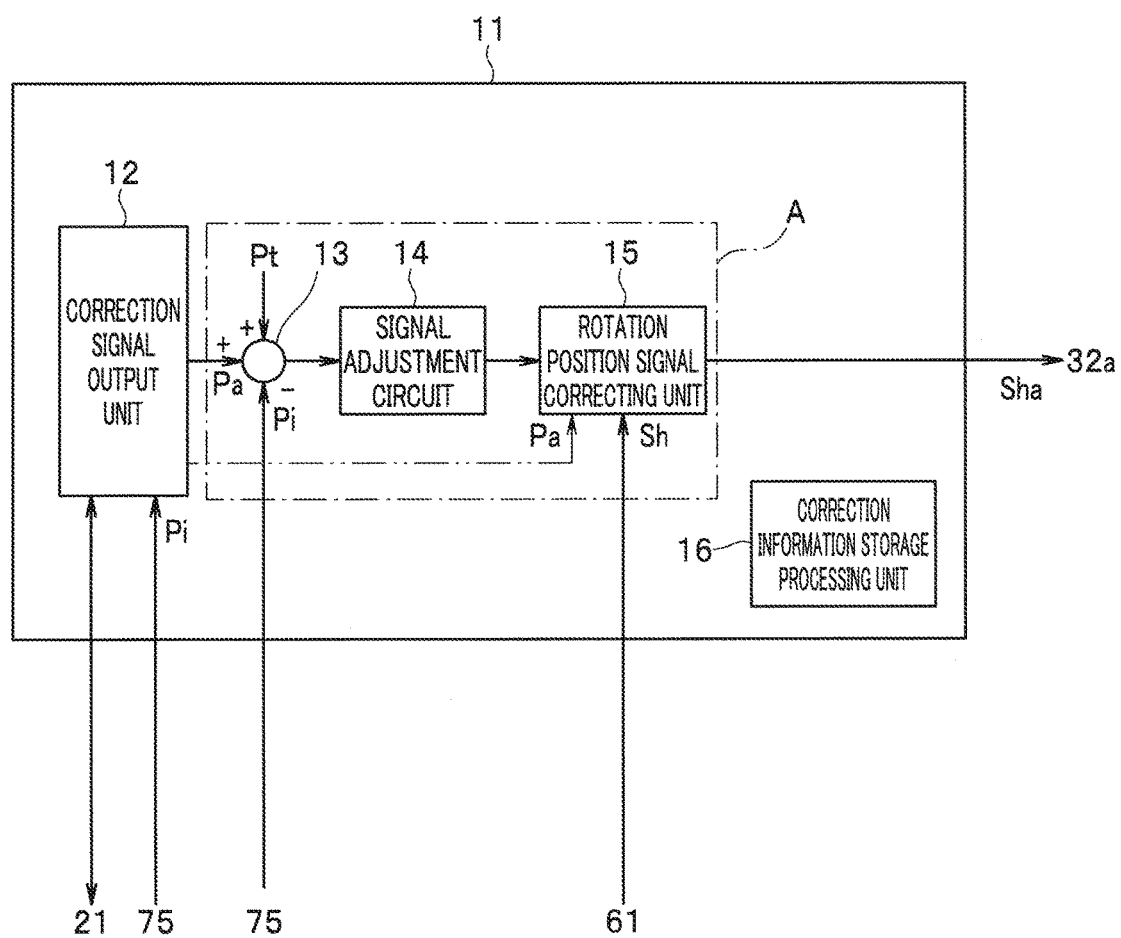
FIG. 2 is a block diagram illustrating an example of a configuration of a control unit of the motor drive apparatus according to the embodiment.

FIG. 2 is a block diagram illustrating an example of a configuration of the control unit 11 of the motor drive apparatus 1 according to the embodiment.

The control unit 11 is a circuit which performs various kinds of control of the motor drive apparatus 1. The control unit 11 includes a correction signal output unit 12, an adder circuit 13, a signal adjustment circuit 14, a rotation position signal correcting unit 15 and a correction information storage processing unit 16.

The correction signal output unit 12 is connected to each of the adder circuit 13, the rotation position signal correcting unit 15, the storage unit 21 and an operation unit 75 within the phase difference calculating unit 71. The correction signal output unit 12 reads phase correction information from the storage unit 21 and outputs a phase correction signal Pa in accordance with the phase correction information to the adder circuit 13. The phase correction information is information for correcting a phase in accordance with an error in the attachment position of the position sensor 41.

The adder circuit 13 is connected to the signal adjustment circuit 14 and the operation unit 75. The adder circuit 13 adds a predetermined target phase difference Pt to the phase correction signal Pa input from the correction signal output unit 12, subtracts a phase difference signal Pi input from the operation unit 75 and outputs an operation result to the signal adjustment circuit 14. The predetermined target phase difference Pt is set in advance in accordance with an ideal phase difference between a rotation position signal Sh output from the position sensor 41 and an induced voltage of a reference phase. For example, if the ideal phase difference between the rotation position signal Sh and a U-phase induced voltage Eu of the reference phase is 225°, the predetermined target phase difference Pt is 225°. Here, while the reference phase is a. U phase, the reference phase may be a V phase or a W phase.

The signal adjustment circuit 14 is connected to the rotation position signal correcting unit 15. The signal adjustment circuit 14 is a circuit which adjusts a signal of the operation result input from the adder circuit 13. For example, the signal adjustment circuit 14 is configured with a proportional integral circuit, and performs proportional integral control so as to remove deviation included in the phase difference signal Pi based on the operation result input from the adder circuit 13 and outputs a lead angle signal to the rotation position signal correcting unit 15. Note that the signal adjustment circuit 14 is not limited to a proportional integral circuit, and may be a PID control circuit or other circuits which adjust the signal.

The rotation position signal correcting unit 15 is connected to the rotation position detecting unit 61 and the gate drive unit 32. The rotation position signal correcting unit 15 corrects a phase of the rotation position signal Sh input from the rotation position detecting unit 61 with the lead angle signal input from the signal adjustment circuit 14.

That is, the adder circuit 13, the signal adjustment circuit 14 and the rotation position signal correcting unit 15 are a correcting unit A which corrects the rotation position detected by the rotation position detecting unit 61 based on the phase correction information and the phase difference information input from the phase difference calculating unit 71 and outputs a corrected rotation position signal Sha. In other words, the correcting unit A corrects the rotation position detected by the rotation position detecting unit 61 based on the predetermined target phase difference Pt, the phase correction information and the phase difference information and outputs the corrected rotation position signal Sha.

The correction information storage processing unit 16 is connected to each unit within the motor drive apparatus 1 through a signal line which is not illustrated to control operation, and performs correction information storage processing which will be described later. For example, the correction information storage processing unit 16 instructs the drive unit 31 to switch ON and OFF of one of transistors 33Uh, 33Ul, 33Vh, 33Vl, 33Wh and 33Wl and controls rotation and stoppage of the motor M. Further, the correction information storage processing unit 16 acquires frequency information from a frequency counter 74 within the phase difference calculating unit 71 and calculates a rotation speed of the motor M. Still further, the correction information storage processing unit 16 acquires a phase difference signal Pi from the operation unit 75 and subtracts the phase difference signal Pi from the predetermined target phase difference Pt to generate phase correction information. Further, the correction information storage processing unit 16 writes the phase correction information in the storage unit 21.

The storage unit 21 is configured with, for example, a rewritable flash ROM, or the like. The storage unit 21 stores the phase correction information based on the phase difference information.

Figure 3:
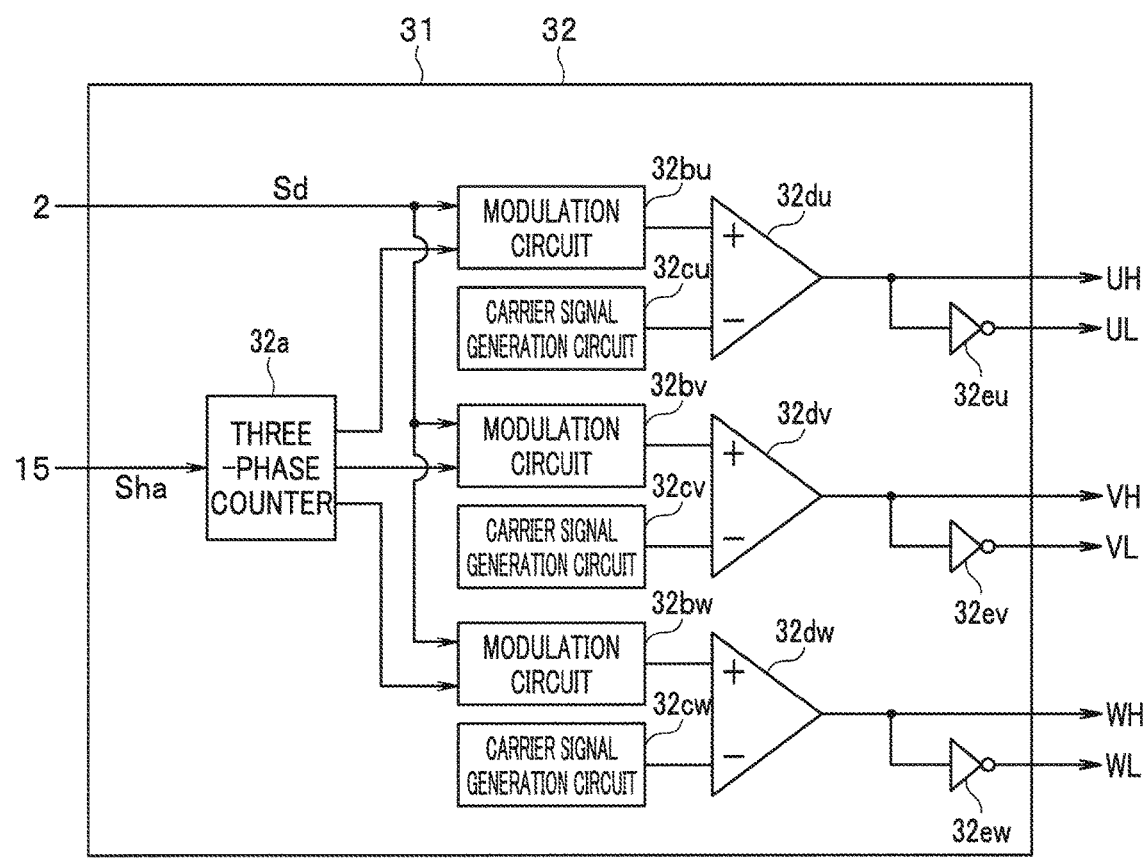
FIG. 3 is a block diagram illustrating an example of a configuration of a gate drive unit of a drive unit of the motor drive apparatus according to the embodiment.

FIG. 3 is a block diagram illustrating an example of a configuration of the gate drive unit 32 of the drive unit 31 of the motor drive apparatus 1 according to the embodiment.

The drive unit 31 is a circuit which generates a drive signal to be output to the motor M based on the corrected rotation position signal Sha. The drive unit 31 includes a gate drive unit 32 and a drive signal generating unit 33.

As illustrated in FIG. 3, the gate drive unit 32 is connected to the drive signal generating unit 33. A duty command signal Sd is input to the gate drive unit 32. The gate drive unit 32 generates a gate signal based on the duty command signal Sd and the corrected rotation position signal Sha input from the rotation position signal correcting unit 15 and outputs the gate signal to the drive signal generating unit 33. The gate drive unit 32 includes a three-phase counter 32a, modulation circuits 33bu, 33bv and 32bw, carrier wave generation circuits 32cu, 32cv and 32cw, comparators 32du, 32dv and 32dw, and inverting circuits 32eu, 32eu and 32ew. Note that, while, in FIG. 3, the duty command signal Sd is input from the microcomputer 2, the duty command signal Sd may be a control signal input from the control unit 11.

The three-phase counter 32a offsets the corrected rotation position signal Sha by a predetermined other amount based on the corrected rotation position signal Sha by an internal counter to generate a first phase signal, further generates second and third phase signals which are obtained by shifting the phase by 120° each, and outputs these signals respectively as a U-phase signal, a V-phase signal and a W-phase signal to the modulation circuits 32bu, 32bw and 32bw. The predetermined offset amount is experientially or experimentally set in advance in accordance with a phase difference between the induced voltage and a position sensor output signal Hup output from the rotation position detecting unit 61.

The modulation circuit 32bu generates a modulation signal such as a sine wave through predetermined operation based on the U-phase signal and the duty command signal Sd and outputs the modulation signal to a non-inverted input terminal of the comparator 32*du*.

The carrier wave generation circuit 32*cu* generates a carrier signal such as a triangle wave and outputs the carrier signal to a non-inverted input terminal of the comparator 32*du*.

When a signal value of the carrier signal is higher than that of the modulation signal, the comparator 32*du* outputs a gate signal of an H level to a gate UH. On the other hand, when the signal value of the carrier signal is lower than that of the modulation signal, the comparator 32*du* outputs a gate signal of an L level to the gate UH.

The inverting circuit 32*eu* inverts output of the comparator 32*du* and outputs the inverted output to the drive signal generating unit 33. More specifically, when the gate signal output from the comparator 32*du* is an H level, the inverting circuit 32*eu* outputs a gate signal of an L level to a gate UL. On the other hand, when the gate signal output from the comparator 32*du* is an L level, the inverting circuit 32*eu* outputs a gate signal of an H level to the gate UL.

The gate drive unit 32 also outputs gate signals to V-phase gates VH and VL, and W-phase gates WH and WL.

Figure 4:
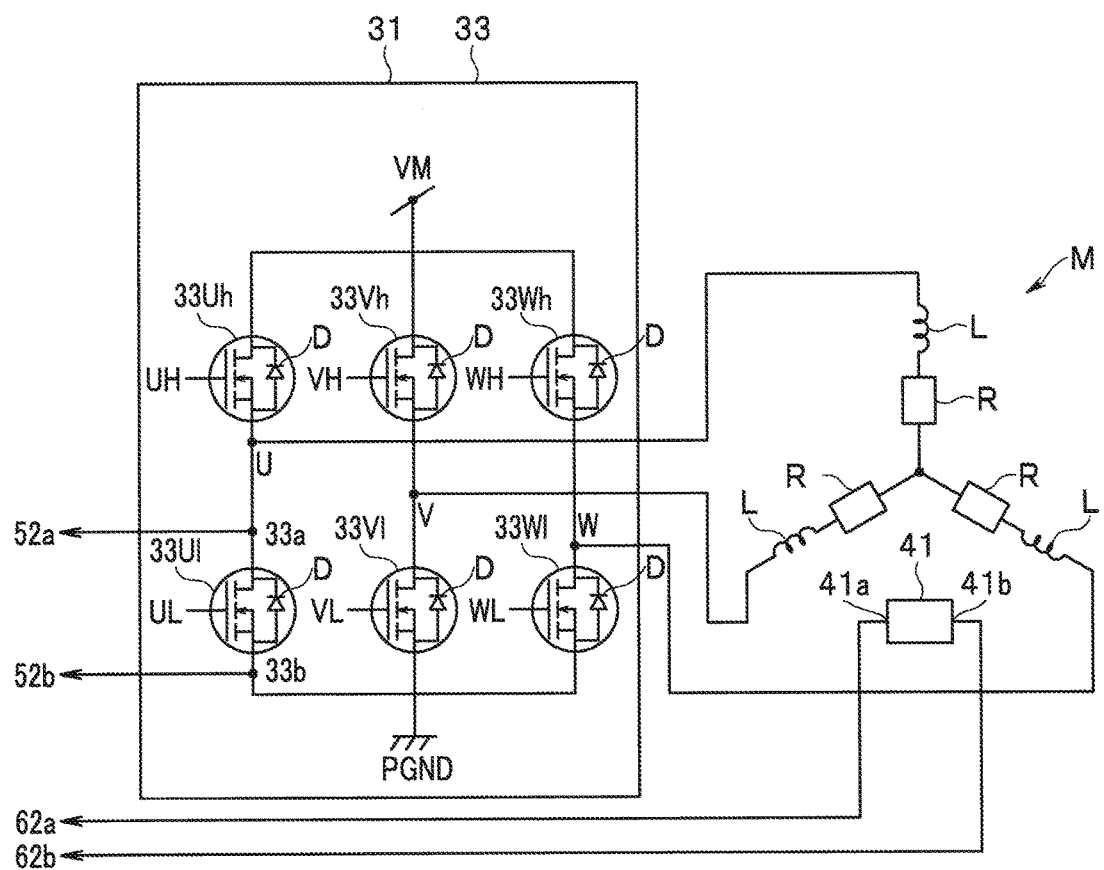
FIG. 4 is a block diagram illustrating an example of a configuration of a drive signal generating unit of the drive unit and the motor of the motor drive apparatus according to the embodiment.

FIG. 4 is a block diagram illustrating an example of a configuration of the drive signal generating unit 33 of the drive unit 31 and the motor M of the motor drive apparatus 1 according to the embodiment.

As illustrated in FIG. 4, the drive signal generating unit 33 is connected to the motor M and the current detecting unit 51. The drive signal generating unit 33 generate a three-phase drive signal from a DC power supply based on the gate signal input from the gate drive unit 32 and outputs the three-phase drive signal to the motor M. When the drive signal is output to the motor M and a motor current flows through the motor M, the rotor rotates. The drive signal generating unit 33 includes six transistors 33Uh, 33Ul, 33Vh, 33Vl, 33Wh and 33Wl.

In the transistor 33Uh, a drain is connected to a power supply terminal, a source is connected to a drain of the transistor 33Ul, and the gate UH is connected to an output terminal of the comparator 32*du*. In the transistor 33Ul, a source is connected to a ground terminal PGND, and the gate UL is connected to the inverting circuit 32*eu*. To each of the transistors 33Uh and 33Ul, a reflux diode D in which a drain side is a cathode and a source side is an anode is attached. The transistors 33Uh and 33Ul perform PWM control so as to be turned ON/OFF according to the gate signal, and outputs a U-phase drive signal to the motor M. In a similar manner, the transistors 33Vh, 33Vl, 33Wh and 33Wl output V-phase and W-phase drive signals to the motor M according to the gate signal.

Further, the drive signal generating unit 33 detects a U-phase diode current Idu of the motor M and outputs the U-phase diode current Idu to the current detecting unit 51. A cathode side contact point 33*a* of the reflux diode D of the transistor 33Ul is connected to a non-inverted input terminal 52*a* of the comparator 52, and an anode side contact point 33*b* is connected to an inverted input terminal 52*b*.

The motor M is configured with, for example, a three-phase brushless DC motor. The motor M includes a stator around which a three-phase coil L formed with a U phase, a V phase and a W phase is wound, and which is not illustrated, and a rotor which rotates inside the stator. Each phase has an internal resistance R.

In the position sensor 41, one terminal 41*a* is connected to a non-inverted input terminal 62*a* of the comparator 62, and the other terminal 41*b* is connected to an inverted input terminal 62*b*. The position sensor 41 is attached to a predetermined attachment position of the stator of the motor M. The position sensor 41 is, for example, a Hall element. The position sensor 41 detects a magnetic field of the rotor and outputs a position sensor output signal Hup which has a fixed phase difference with the induced voltage generated by rotation of the rotor to the rotation position detecting unit 61.

Figure 5:
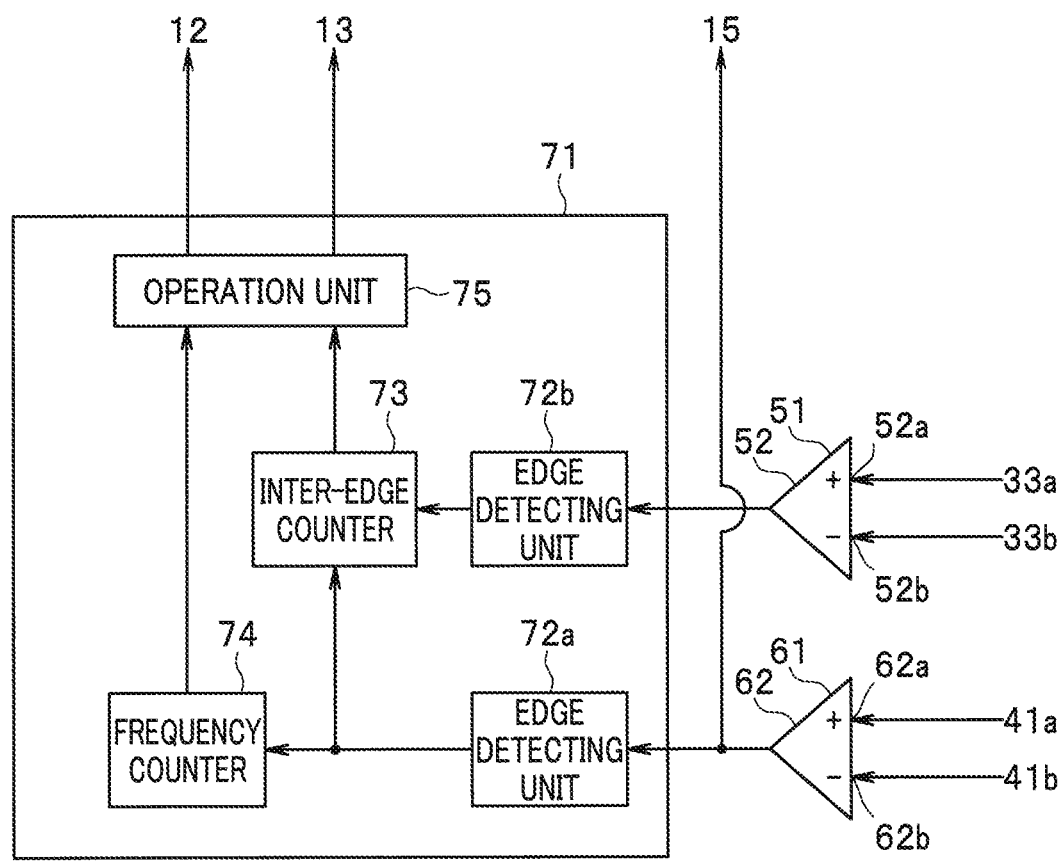
FIG. 5 is a block diagram illustrating an example of a configuration of a current detecting unit, a position detecting unit and a phase difference calculating unit of the motor drive apparatus according to the embodiment.

FIG. 5 is a block diagram illustrating an example of a configuration of the current detecting unit 51, the rotation position detecting unit 61 and the phase difference calculating unit 71 of the motor drive apparatus 1 according to the embodiment.

As illustrated in FIG. 5, the current detecting unit 51 includes a comparator 52. An output terminal of the comparator 52 is connected to the phase difference calculating unit 71. When a motor current flows from the cathode side contact point 33*a* to the anode side contact point 33*b* via the transistor 33Ul, a potential becomes higher at the cathode side contact point 33*a* than at the anode side contact point 33*b*, and the comparator 52 outputs a motor current value signal Id of an level to the phase difference calculating unit 71. On the other hand, when a U-phase diode current Idu which is a motor current from the anode side contact point 33*b* to the cathode side contact point 33*a* via the reflux diode D flows, the comparator 52 outputs a motor current value signal Id of an L level to the phase difference calculating unit 71. The motor current value signal Id is a voltage signal in accordance with a current value.

That is, the current detecting unit 51 detects a motor current flowing through at least one coil of the motor M. The current detecting unit 51 detects a timing of zero-cross of the phase of the motor current and outputs the motor current value signal Id.

The rotation position detecting unit 61 includes a comparator 62. An output terminal of the comparator 62 is connected to the rotation position signal correcting unit 15 and the phase difference calculating unit 71. When the position sensor output signal Hup is positive, the comparator 62 outputs the rotation position signal Sh of an H level to the rotation position signal correcting unit 15 and the phase difference calculating unit 71. On the other hand, when the position sensor output signal Hup is negative, the comparator 62 outputs the rotation position signal Sh of an L level to the rotation position signal correcting unit 15 and the phase difference calculating unit 71.

That is, the rotation position detecting unit 61 detects a rotation position of the rotor provided in the motor M. More specifically, the rotation position detecting unit 61 detects a timing of zero-cross of a phase of the rotation position of the rotor according to the position sensor output signal Hup input from the position sensor 41 and outputs the rotation position signal Sh.

The phase difference calculating unit 71 is a circuit which calculates a phase difference between the motor current value signal Id and the rotation position signal Sh and outputs the phase difference to the control unit 11. More specifically, the phase difference calculating unit 71 calculates phase difference information which is a phase difference between the motor current and the rotation position when the rotation speed of the motor M is equal to or lower than a second predetermined rotation speed and phase difference information which is a phase difference between the motor current and the rotation position when the rotation speed of the motor M exceeds the second predetermined rotation speed. The phase difference calculating unit 71 includes edge detecting units 72a and 72b, an inter-edge counter 73, a frequency counter 74 and an operation unit 75.

When the edge detecting unit 72a detects a rising edge of the rotation position signal Sh input from the rotation position detecting unit 61, the edge detecting unit 72a outputs a position edge signal to the inter-edge counter 73.

When the edge detecting unit 72b detects a rising edge of the motor current value signal Id input from the current detecting unit 51, the edge detecting unit 72b outputs a current edge signal to the inter-edge counter 73.

The inter-edge counter 73 counts with an internal clock from when the position edge signal is input from the edge detecting unit 72a until when the current edge signal is input from the edge detecting unit 72b, detects a time difference between the edges between the position edge signal and the current edge signal and outputs the time difference between the edges to the operation unit 75.

The frequency counter 74 counts the number of times the position edge signal is input from the edge detecting unit 72a for a predetermined time period, detects a frequency of the rotation position signal Sh and outputs the frequency to the operation unit 75.

The operation unit 75 calculates phase difference information between the rotation position signal Sh and the motor current value signal Id through predetermined operation based on the time difference between the edges input from the inter-edge counter 73 and the frequency input from the frequency counter 74, generates a phase difference signal Pi in accordance with the phase difference information and outputs the phase difference signal Pi to the control unit 11. The phase difference information is expressed with equation (1):

$$\text{Phase difference information} = \text{time difference between edges} \times \text{frequency} \times 360° \quad (1)$$

That is, the phase difference calculating unit 71 detects each edge of the motor current value signal Id and the rotation position signal Sh, outputs phase difference information and the drive signal when the drive signal is stopped to idle the motor M and calculates phase difference information when the motor M is driven.

(Operation)

Figure 7A:
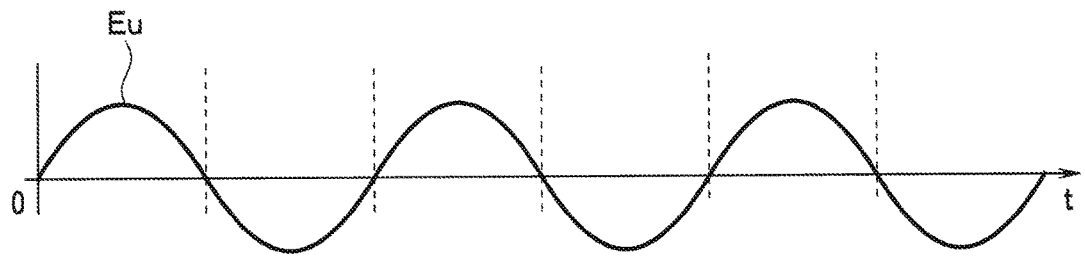
FIG. 7A is a waveform diagram of an induced voltage of the motor drive apparatus according to the embodiment.
Figure 7B:
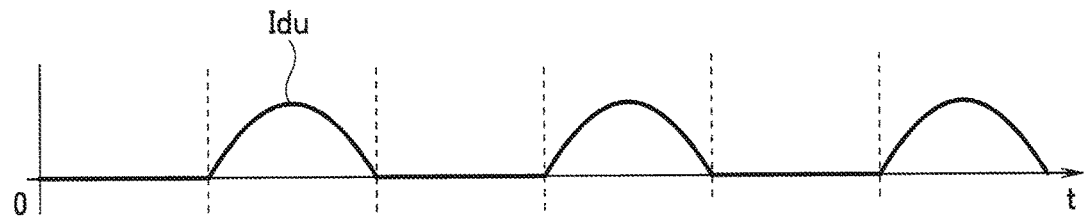
FIG. 7B is a waveform diagram of a motor current of the motor drive apparatus according to the embodiment.
Figure 7C:
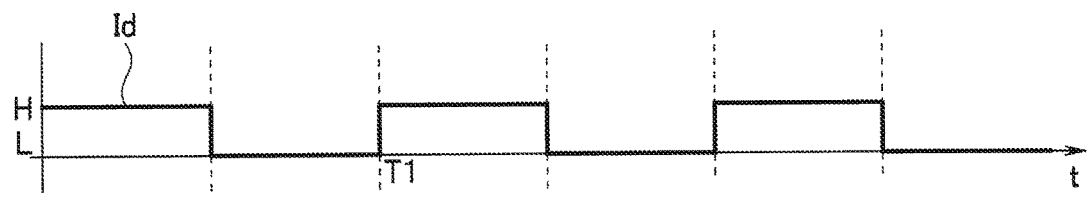
FIG. 7C is a waveform diagram of a motor current value signal of the motor drive apparatus according to the embodiment.
Figure 7D:
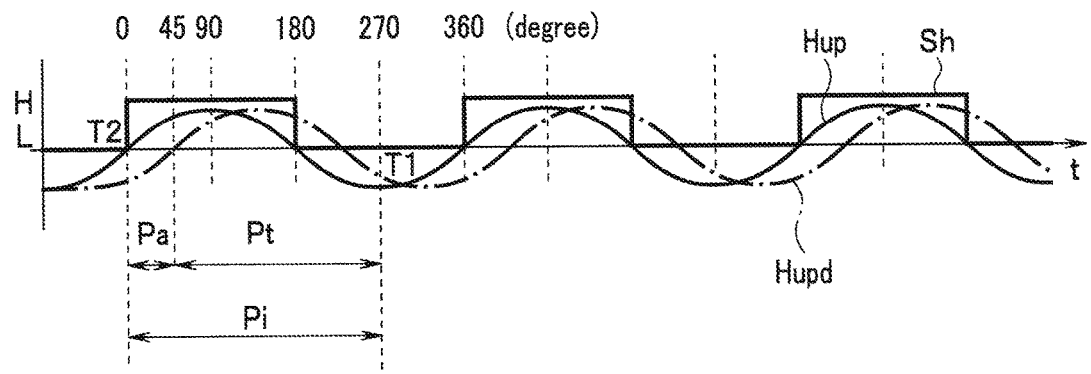
FIG. 7D is a waveform diagram of a position sensor output signal and a rotation position signal of the motor drive apparatus according to the embodiment.

FIG. 6 is a flowchart illustrating flow of correction information storage processing of the motor drive apparatus 1 according to the embodiment. FIG. 7A to FIG. 7D are waveform diagrams of the motor drive apparatus 1 according to the embodiment. FIG. 7A is a waveform diagram of an induced voltage, FIG. 7B is a waveform diagram of a U-phase diode current Idu, FIG. 7C is a waveform diagram of a motor current value signal, and FIG. 7D is a waveform diagram of the position sensor output signals Hup and Hupd and the rotation position signal Sh.

Subsequently, the correction information storage processing will be described. The correction information storage processing is processing for causing the phase correction information to be stored in the storage unit 21. The correction information storage processing may be performed, for example, before shipment from a factory, or the like, or may be performed by a user before the motor drive apparatus 1 is used.

When an instruction of starting the correction information storage processing is input using the microcomputer 2, the correction information storage processing unit 16 starts the correction information storage processing.

The rotation speed of the motor M is increased (S11). The correction information storage processing unit 16 issues an instruction for driving the motor M to the gate drive unit 32 and increases the rotation speed of the motor M.

It is determined whether or not the rotation speed of the motor M is equal to or higher than a first predetermined rotation speed (S12). The correction information storage processing unit 16 detects the rotation speed of the motor M with the rotation position signal Sh. When the rotation speed of the motor M is equal to or higher than the first predetermined rotation speed, the processing proceeds to S13. On the other hand, when the rotation speed of the motor M is lower than the first predetermined rotation speed, the processing returns to S11. The first predetermined rotation speed is, for example, a rated rotation speed of the motor M.

The motor M is idled (S13). The correction information storage processing unit 16 issues an instruction for turning OFF the gates UH, VH, VL, WH and WL to the gate drive unit 32 to idle the motor M.

It is determined whether or not the rotation speed of the motor M is equal to or lower than the second predetermined rotation speed (S14). The correction information storage processing unit 16 detects the rotation speed of the motor M with the rotation position signal Sh. When the rotation speed of the motor M is equal to or lower than the second predetermined rotation speed, the processing proceeds to S15. On the other hand, when the rotation speed of the motor M exceeds the second predetermined rotation speed, the processing returns to S14. When the rotation speed of the motor M becomes small, a phase of the induced voltage and a phase of the motor current approximate each other. The second predetermined rotation speed is experientially or experimentally set in advance so that the phase of the induced voltage approximates the phase of the motor current.

Lower sides of the V phase and the W phase of the drive unit 31 are turned ON (S15). The correction information storage processing unit 16 issues an instruction for turning ON the gates VL and WL so that the current detecting unit 51 can favorably detect the U-phase diode current Idu, to the gate drive unit 32 and turns ON the transistors 33Vl and 33Wl.

The phase difference signal Pi is detected (S16). As illustrated in FIG. 7A and FIG. 7B, when the U-phase induced voltage Eu becomes negative, the U-phase diode current Idu flows through the reflux diode D of the transistor 33Ul. As illustrated in FIG. 7C, at time T1, the motor current value signal Id rises. As illustrated in FIG. 7D, at time T2, when the position sensor output signal Hup becomes positive, the rotation position signal Sh output from the rotation position detecting unit 61 rises. The phase difference calculating unit 71 generates a phase difference signal Pi based on a time difference between edges from time T2 to time T1. The correction information storage processing unit 16 detects the phase difference signal Pi output from the phase difference calculating unit 71.

Phase correction information is generated by subtracting a predetermined target phase difference Pt from the phase difference signal Pi (S17). The correction information storage processing unit 16 subtracts the predetermined target phase difference Pt from the phase difference signal Pi to generate phase correction information in accordance with the subtraction result. For example, in the example of FIG. 7D, the predetermined target phase different Pt is the same as a phase difference of the ideal position sensor output signal. Hupd (dashed-dotted line). Therefore, when the phase difference of the ideal position sensor output signal Hupd is 225°, and the phase difference signal Pi in the position sensor output signal Hup (solid line) input from the position sensor 41 is 270°, the phase correction information is 270°−225°=45°. That is, the phase correction information is calculated by the predetermined target phase difference Pt being subtracted from the phase difference information.

The phase correction information is stored in the storage unit 21 (S18). The correction information storage processing unit 16 stores the phase correction information in the storage unit 21.

Processing from S11 to S18 constitute the correction information storage processing unit 16. Note that processing of part or all of the correction information storage processing unit 16 may be executed by the microcomputer 2 under operation by the user.

Subsequently, operation of the motor drive apparatus 1 will be described.

Figure 8A:
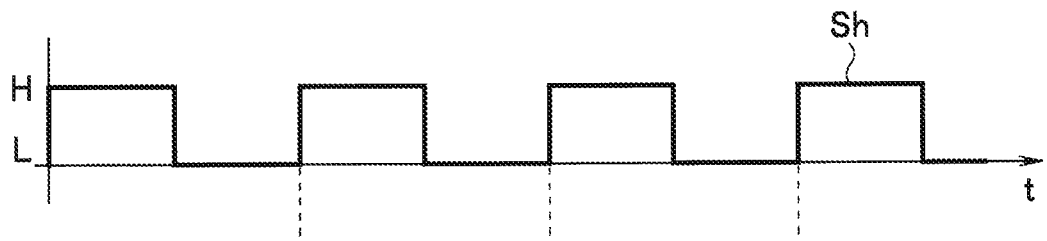
FIG. 8A is a waveform diagram of the rotation position signal of the motor drive apparatus according to the embodiment.
Figure 8B:
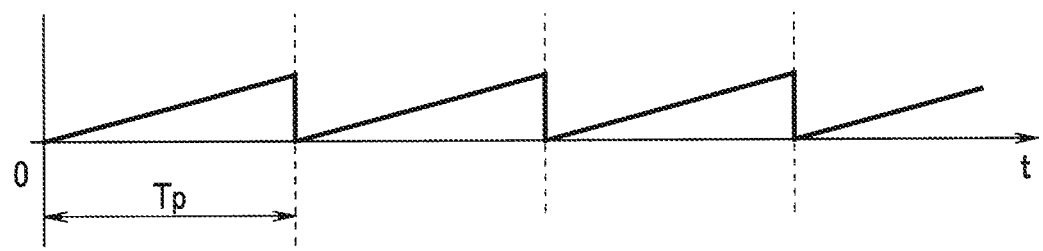
FIG. 8B is a waveform diagram of a timer signal of the motor drive apparatus according to the embodiment.
Figure 8C:
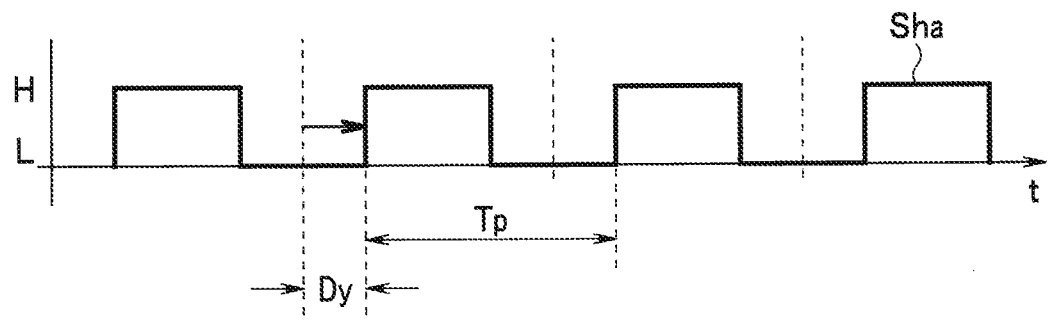
FIG. 8C is a waveform diagram of a correction rotation position signal of the motor drive apparatus according to the embodiment.

FIG. 8A to FIG. 8C are waveform diagrams of the motor drive apparatus 1 according to the embodiment. FIG. 8A is a waveform diagram of the rotation position signal Sh, FIG. 8B is a waveform diagram of a timer signal, and FIG. 8C is a waveform diagram of the corrected rotation position signal Sha.

The correction signal output unit 12 reads the phase correction information from the storage unit 21 and outputs the phase correction signal Pa in accordance with the phase correction information to the adder circuit 13.

The adder circuit 13 and the signal adjustment circuit 14 add the phase correction signal Pa and the predetermined target phase difference Pt, subtracts the phase difference signal Pi, performs proportional integral control on the operation result and outputs a lead angle signal to the rotation position signal correcting unit 15.

As illustrated in FIG. 8A and FIG. 8B, the rotation position signal correcting unit 15 detects a cycle Tp of the rotation position signal Sh using a timer counter which is not illustrated. As illustrated in FIG. 8C, the rotation position signal correcting unit 15 generates the corrected rotation position signal Sha by shifting the cycle Tp of the rotation position signal Sh by a time difference Dy in accordance with the lead angle signal and outputs the corrected rotation position signal Sha to the gate drive unit 32.

The time difference Dy can be expressed with equation (2):

$$Dy = Tp \times (\text{lead angle signal}/360°) \quad (2)$$

The corrected rotation position signal Sha and the duty command signal Sd are input to the gate drive unit 32. The gate drive unit 32 outputs a gate signal to the drive signal generating unit 33 based on the corrected rotation position signal Sha and the duty command signal Sd. The drive signal generating unit 33 drives the motor M based on the gate signal.

The current detecting unit 51 detects the U-phase diode current Idu and outputs the motor current value signal Id to the phase difference calculating unit 71. The rotation position detecting unit 61 detects the rotation position signal Sh and outputs the rotation position signal Sh to the phase difference calculating unit 71 and the control unit 11.

The phase difference calculating unit 71 generates the phase difference signal Pi based on the motor current value signal Id and the rotation position signal Sh and outputs the phase difference signal Pi to the control unit 11.

By this means, at the motor drive apparatus 1, the phase correction information in accordance with an error in the attachment position of the position sensor 41 is detected and stored in the storage unit 21. Then, at the motor drive apparatus 1, the drive signal is corrected with the phase correction information stored in the storage unit 21, and the motor M is driven at optimum efficiency.

According to the embodiment, it is possible to provide the motor drive apparatus 1 which outputs the drive signal in which an error in the attachment position of the position sensor 41 is corrected.

Modification of Embodiment

While, in the embodiment, the phase correction information stored in the storage unit 21 and the predetermined target phase difference Pt are added by the adder circuit 13, the phase correction information including the predetermined target phase difference Pt may be stored in the storage unit 21.

Figure 9:
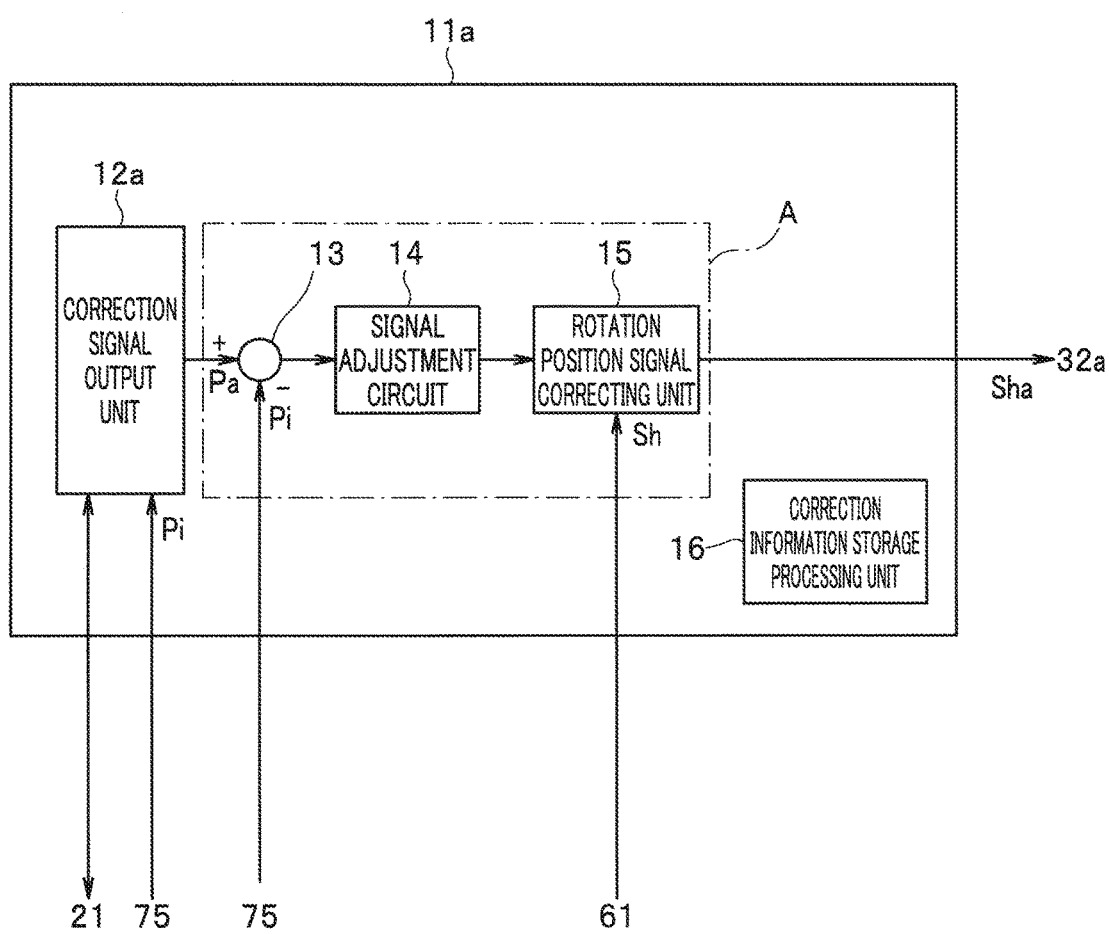
FIG. 9 is a block diagram illustrating an example of a configuration of a control unit of a motor drive apparatus according to a modification of the embodiment.

FIG. 9 is a block diagram illustrating an example of a configuration of a control unit 11a of the motor drive apparatus 1 according to a modification of the embodiment. In description of the modification, the same reference numerals are assigned to components which are the same as those in the embodiment, and description will be omitted.

In a control unit 11a, the predetermined target phase difference Pt is not added at an adder circuit 13a. That is, in the modification, the phase difference information when the rotation speed of the motor M is equal to or lower than the second predetermined rotation speed is used as the phase correction information.

A correction signal output unit 12a outputs the phase correction signal Pa to the adder circuit 13a. The adder circuit 13a subtracts the phase difference signal Pi from the phase correction signal Pa and outputs the operation result to the signal adjustment circuit 14.

Subsequently, flow of the correction information storage processing of the motor drive apparatus 1 will be described.

Figure 10:
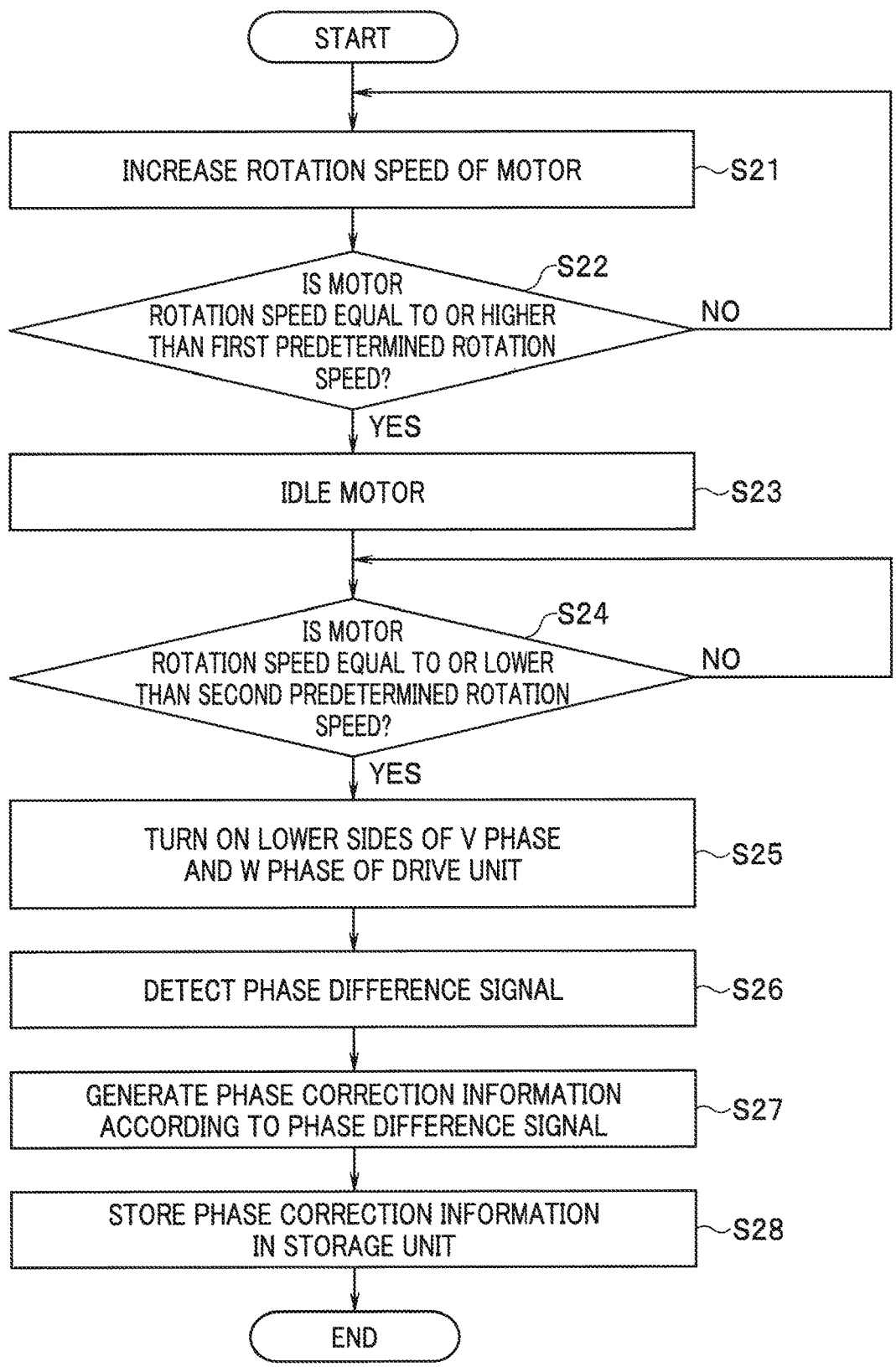
FIG. 10 is a flowchart illustrating flow of correction information storage processing of the motor drive apparatus according to the modification of the embodiment.
Figure 11A:
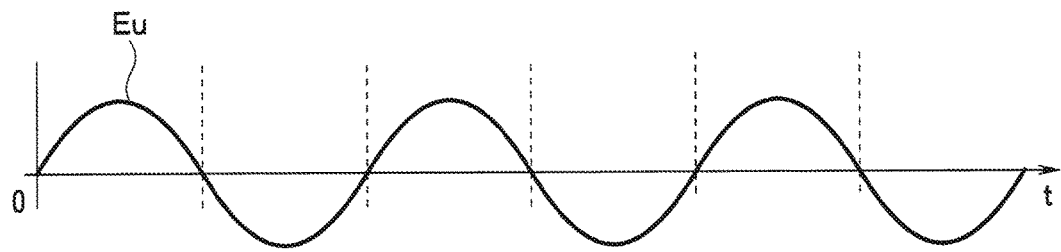
FIG. 11A is a waveform diagram of an induced voltage of the motor drive apparatus according to the modification of the embodiment.
Figure 11B:
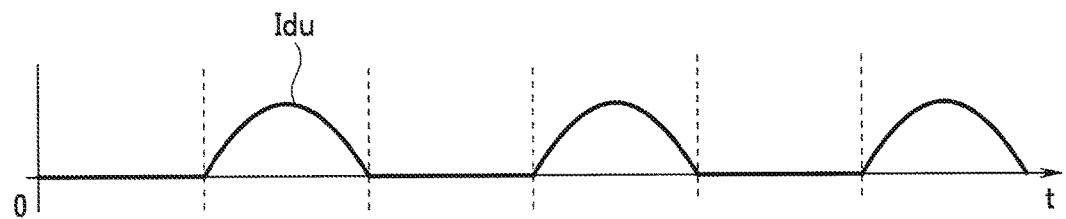
FIG. 11B is a waveform diagram of a motor current of the motor drive apparatus according to the modification of the embodiment.
Figure 11C:
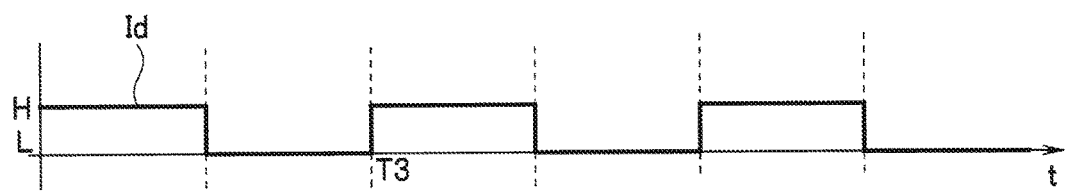
FIG. 11C is a waveform diagram of a motor current value signal of the motor drive apparatus according to the modification of the embodiment.
Figure 11D:
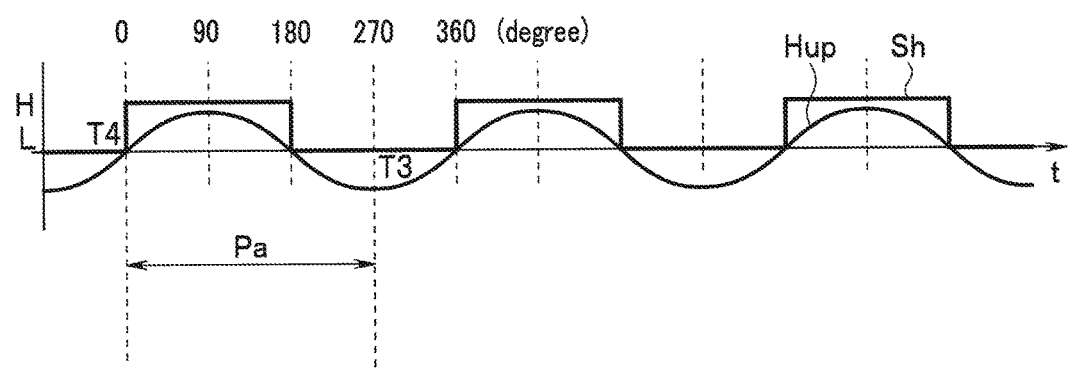
FIG. 11D is a waveform diagram of a position sensor output signal and a rotation position signal of the motor drive apparatus according to the modification of the embodiment.

FIG. 10 is a flowchart illustrating flow of the correction information storage processing of the motor drive apparatus 1 according to the modification of the embodiment. FIG. 11A to FIG. 11D are waveform diagrams of the motor drive apparatus 1 according to the embodiment. FIG. 11A is a waveform diagram of the induced voltage, FIG. 11B is a waveform diagram of the U-phase diode current Idu, FIG. 11C is a waveform diagram of the motor current value signal Id, and FIG. 11D is a waveform diagram of the position sensor output signal Hup and the rotation position signal Sh.

Because S21 to S25 are the same as S11 to S15, description will be omitted.

The phase difference signal Pi is detected (S26). As illustrated in FIG. 11A, FIG. 11B and FIG. 11C, at time T3, the motor current value signal Id rises. At time T4, the position sensor output signal Hup changes from negative to positive, and the rotation position signal Sh rises. The phase difference calculating unit 71 generates the phase difference signal Pi illustrated in FIG. 11D. The correction information storage processing unit 16 detects the phase difference signal Pi output from the phase difference calculating unit 71.

The phase correction information in accordance with the phase difference signal Pi is generated (S27). The correction information storage processing unit 16 generates the phase correction information in accordance with the phase difference signal Pi.

Because S28 is the same as S18, description will be omitted.

The processing from S21 to S28 constitute the correction information storage processing according to the modification of the embodiment.

According to the modification of the embodiment, it is possible to simplify the configuration of the motor drive apparatus 1, and it is possible to provide the motor drive apparatus 1 which outputs a drive signal in which an error in an attachment position of the position sensor 41 is corrected.

Note that, while, in the embodiment, the phase correction signal Pa is output from the correction signal output unit 12 to the adder circuit 13, the phase correction signal Pa may be output from the correction signal output unit 12 to the rotation position signal correcting unit 15 (dashed-two dotted line in FIG. 2), and the rotation position signal Sh may be corrected using the phase correction signal Pa at the rotation position signal correcting unit 15.

Note that, while, in the embodiment and the modification, one position sensor 41 is attached to the stator, a plurality of position sensors 41 may be attached to the stator.

Note that, while, in the embodiment and the modification, at the correction information storage processing unit 16, the motor M is idled until the rotation speed of the motor M becomes equal to or lower than the second predetermined rotation speed (S17, S27), it is also possible to measure a diode current value and idle the motor M until the diode current value becomes equal to or less than a predetermined value.

Note that, while, in the embodiment and the modification, functions of each unit are implemented with circuits, the functions of each unit may be implemented by a program being executed.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A motor control apparatus comprising:
   a current detecting unit that detects a motor current flowing through at least one coil of a motor;
   a rotation position detecting unit that detects a rotation position of a rotor provided in the motor;
   a phase difference calculating unit that calculates first phase difference information which is a phase difference between the motor current and the rotation position when a rotation speed of the motor is equal to or lower than a predetermined rotation speed, and second phase difference information which is a phase difference between the motor current and the rotation position when the rotation speed of the motor exceeds the predetermined rotation speed;
   a storage unit that stores phase correction information based on the first phase difference information;
   a correcting unit that corrects the rotation position detected by the rotation position detecting unit based on the phase correction information and the second phase difference information input from the phase difference calculating unit and output a corrected rotation position signal; and
   a drive unit that generates a drive signal to be output to the motor based on the corrected rotation position signal.

2. The motor control apparatus according to claim 1, wherein the current detecting unit detects a timing of zero-cross of a phase of the motor current and outputs a motor current value signal, and
   the rotation position detecting unit detects a timing of zero-cross of a phase of the rotation position of the rotor and outputs a rotation position signal.

3. The motor control apparatus according to claim 2, wherein the rotation position detecting unit outputs the rotation position signal according to a position sensor output signal input from a position sensor attached at a predetermined attachment position of a stator of the motor.

4. The motor control apparatus according to claim 3, wherein the position sensor is provided in plurality at the stator.

5. The motor control apparatus according to claim 3, wherein the position sensor is configured with a Hall element.

6. The motor control apparatus according to claim 3, wherein the phase correction information is information for correcting a phase according to an error in an attachment position of the position sensor.

7. The motor control apparatus according to claim 2, wherein the phase difference calculating unit detects each edge of the motor current value signal and the rotation position signal and calculates the first phase difference information and the second phase difference information.

8. The motor control apparatus according to claim 1, wherein the motor is a brushless DC motor.

9. The motor control apparatus according to claim 1, wherein the first phase difference information is phase difference information when output of the drive signal is stopped to idle the motor, and
   the second phase difference information is phase difference information when the drive signal is output to drive the motor.

10. The motor control apparatus according to claim 1, wherein the phase correction information is the first phase difference information.

11. The motor control apparatus according to claim 1, wherein the phase correction information is calculated by subtracting a predetermined target phase difference from the first phase difference information, and
    the correcting unit corrects the rotation position detected by the rotation position detecting unit based on the predetermined target phase difference, the phase correction information and the second phase difference information and outputs the corrected rotation position signal.

12. A motor drive apparatus comprising:
    a motor; and
    a control apparatus,
    wherein the control apparatus comprises:
    a current detecting unit that detects a motor current flowing through at least one coil of the motor;
    a rotation position detecting unit that detects a rotation position of a rotor provided in the motor;
    a phase difference calculating unit that calculates first phase difference information which is a phase difference between the motor current and the rotation position when a rotation speed of the motor is equal to or lower than a predetermined rotation speed, and second phase difference information which is a phase difference between the motor current and the rotation position when the rotation speed of the motor exceeds the predetermined rotation speed;
    a storage unit that stores phase correction information based on the first phase difference information;

a correcting unit that corrects the rotation position based on the phase correction information and the second phase difference information input from the phase difference calculating unit and output a corrected rotation position signal; and
a drive unit that generates a drive signal to be output to the motor based on the corrected rotation position signal.

* * * * *